United States Patent [19]

Mellovist et al.

[11] 4,359,969

[45] Nov. 23, 1982

[54] METHOD OF IMPROVING THE COMBUSTION OF FUEL CONTAINING HYDROCARBON COMPOUNDS IN THE COMBUSTION CHAMBER OR CHAMBERS OF INTERNAL COMBUSTION ENGINES, AND A LIQUID COMPOSITION FOR CARRYING THE METHOD INTO EFFECT

[76] Inventors: Allan Mellovist, Baltzarsgatan 8, S-211 36 Malmö; Thorild N. K. E. Anderberg, Papegojvägen 3, S-230 11 Falsterbo, both of Sweden

[21] Appl. No.: 150,744

[22] Filed: May 19, 1980

Related U.S. Application Data

[63] Continuation of Ser. No. 908,519, May 22, 1978, abandoned, which is a continuation-in-part of Ser. No. 710,936, Aug. 2, 1976, abandoned.

[51] Int. Cl.³ .............................................. F02B 75/12
[52] U.S. Cl. ................................... 123/1 A; 123/3; 123/DIG. 12; 123/198 A; 44/53
[58] Field of Search .......... 123/1 A, 198 A, DIG. 12, 123/3; 44/53, 56

[56] References Cited

U.S. PATENT DOCUMENTS 2,277,749  3/1942  Eckel et al. ..................... 123/198 A
3,945,366  3/1976  Matthews ....................... 123/198 A Primary Examiner—Ira S. Lazarus
Assistant Examiner—E. Rollins Cross
Attorney, Agent, or Firm—Irvin A. Lavine

[57] ABSTRACT

For the improved combustion of hydrocarbon compounds, for example those contained in gasoline, diesel fuel etc., in internal combustion engines a liquid composition comprising hydrogen peroxide, water, aliphatic alcohol having 1-4 carbon atoms, and preferably thin lubricating oil and anticorrosive is admixed with the fuel air mixture in the internal combustion engines.

6 Claims, No Drawings

METHOD OF IMPROVING THE COMBUSTION OF FUEL CONTAINING HYDROCARBON COMPOUNDS IN THE COMBUSTION CHAMBER OR CHAMBERS OF INTERNAL COMBUSTION ENGINES, AND A LIQUID COMPOSITION FOR CARRYING THE METHOD INTO EFFECT

This is a continuation of application Ser. No. 908,519 filed May 22, 1978, now abandoned, which is a continuation-in-part of application Ser. No. 710,936, filed Aug. 2, 1976, now abandoned, which is relied upon and the entire disclosure and specification of which is hereby incorporated by reference.

This invention relates to a method and a liquid composition for improving the combustion of hydrocarbon compounds, such as in gasoline, diesel fuel, in the combustion chambers of internal combustion engines and for reducing exhaust gases, such as CO, HC, $NO_x$, for increasing engine power effect and reducing fuel consumption by catalysis and conversion.

With the increasing density of automobile traffic, primarily in big city areas, the exhaust gases of automobiles give rise to an ever greater air pollution. Especially carbon monoxide and nitrous gases are extremely injurious to health. Many countries have adopted severe regulations with regard to permissible maximum CO-contents in the exhaust gases of automobiles, and there is consequently a great need for improved combustion systems and satisfactory exhaust gas purifiers.

Several more or less effective systems of realising such exhaust gas purification have been developed. However, they are disadvantageous inasmuch as they increase gasoline consumption and besides are complicated and expensive to manufacture and utilize. The most common method is to arrange a catalyst system in the exhaust pipe of the internal combustion engine, whereby to cause an oxidation of carbon monoxide and a reduction of nitrous gases.

The present invention provides a method of improving the combustion of hydrocarbon compounds in the combustion chambers of internal combustion engines, in which a liquid composition according to the invention is admixed with the fuel air mixture of the engines, said liquid composition comprising hydrogen peroxide, water, aliphatic alcohol having 1-4 carbon atoms, and preferably a thin lubricating oil. Preferably, the liquid composition comprises, calculated per volume unit, 1-10% hydrogen peroxide, 50-80% water, 15-45% of an aliphatic alcohol having 1-4 carbon atoms, 2-15% of a thin lubricating oil and up to 5% of an anticorrosive. The most preferred composition comprises 3-7% hydrogen peroxide, 60-75% water, 32-17% ethanol, 5% thin lubricating oil and up to 1% anticorrosive.

The composition is introduced into the intake manifold of the engine from a simple apparatus. This apparatus comprises a closed container which via a tube opens into the intake manifold of the engine. The container has an air intake which opens at the bottom of the container, and a closable composition filler opening. By the vacuum generated in the intake manifold air is sucked into the air intake of the container, distributed at the bottom of the container into the liquid composition and when rising through the liquid entrains small droplets thereof, whereupon the resultant mixture is injected into the intake manifold of the engine, mixing with the fuel air mixture.

The effect of the composition according to the invention probably depends upon the following factors. The composition functions as a "moderator", that is, it cuts the combustion peaks. The supply of water and hydrogen to the engine permits utilizing more steps in the combustion chain. The composition serves as a catalyst for the fuel conversion. The compression is increased and the atomization in the intake manifold is improved. Moreover, improved cooling and improved utilization of the adiabatic process are realised.

The reaction responsible for CO oxidation is

$$CO + OH \rightleftharpoons CO_2 + H$$

wherein a number of elementary reactions influencing the local concentrations of OH and H are speed determining.

The reactions determining the $NO_x$-discharge are Zel'dovitch's reactions:

$$N_2 + O \rightleftharpoons N + NO$$

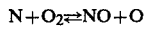

$$N + O_2 \rightleftharpoons NO + O$$

which possibly include

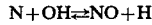

$$N + OH \rightleftharpoons NO + H$$

and probably also a less known mechanism in the sludge zone which gives rise to the so-called prompt $NO_x$-formation.

The method and the composition according to the invention have been tested in the laboratory under thoroughly controlled conditions in two different series (respectively at Gulf Research Center, Rotterdam, Holland, and at Statens Teknologiska Institut, Oslo, Norway), as well as in practical experiments on automobiles in ordinary traffic.

For the laboratory tests, Series A, two standard automobiles were chosen as test cars, namely an Opel Rekord 1700, Model 1970 (car 1), and a Ford Taunus 1600, Model 1974 (car 2). When the tests commenced, car 1 had been driven about 70,000 km and car 2 about 25,000 km. The cars were equipped with instruments, checked and adjusted so as to agree with the manufacturer's specifications. The cars were then driven on the road for determination of the times of acceleration and presetting of the chassis dynamometers in conformity with the acceleration conditions on the road.

After the cars had been mounted on the chassis dynamometers they were run respectively without and with admixture of the composition according to the invention for determination of:

1. Carbon monoxide content as well as content of hydrocarbons and nitrous gases in the exhaust gases by NDIR (Non Dispersant Infra Red) at idling and at various speeds.
2. Gasoline consumption at various speeds.
3. Power curve.

The measurements were made by so-called "CVS bag analysis". It should be observed that no adjustments of carburetors etc. were made in these laboratory tests to compensate for the increased air supply associated with the use of the composition according to the invention. In the tests use was made of a composition consisting of 67% of a 2% hydrogen peroxide, 27% ethanol, 5% of a thin lubricating oil, and 1% anticorrosive. 1 liter of this composition was consumed at a run of about 4,000–4,500 km using an injection nozzle of 1.5 mm diameter. The results of the measurements are indicated in Tables 1–7. A summary shows that 1. the use of the composition according to the invention reduced the carbon monoxide content by 40–50%;
2. the remaining components in the exhaust gases (hydrocarbons and nitrous gases) did not increase but rather diminished or remained at the same values as without any admixture of the composition according to the invention;
3. the admixture of the composition according to the invention reduced the gasoline consumption;
4. the use of the composition according to the invention increased the engine power.

In order also to test the use of the composition according to the invention on ordinary driving use was made of a third test car, namely a Ford Taunus Combi 1600, Model 1974, which was driven during one year a distance of almost 30,000 km, with admixture of the composition according to the invention to the fuel air mixture. Repeated measurements with a standard measuring instrument established a CO-content of 0.7% (corresponding to 0.75% with the use of a precision instrument, Beckman NDIR Instrument Model 315 B) simultaneously as the gasoline consumption decreased by 0.1 liter per 10 km. The explanation why this test showed so much better results than the laboratory tests appears to be that int. al. the carburetor had been adjusted with regard to the increased air supply that is associated with the use of the composition according to the invention. Besides, the composition according to the invention is assumed to exert a long-range cleaning effect on the engine which thus will not, as is the case on ordinary driving, become more and more dirty, thereby emitting ever dirtier exhaust gases. The engine was also subjected to a partial check-up, including oil tests, but nothing remarkable was found. The same engine check-up was made on test car 1. These results are shown in Table 8.

TABLE 1

Fuel consumption at a constant speed of 50 km/h, and CO-content on idling for car 1

| Test | Fuel system | Liter/10 km | km/liter | CO-content on idling % | Oil temperature °C. | Comments |
|------|-------------|-------------|----------|------------------------|---------------------|----------|
| 1 | normal | 0.600 | 16.67 | N.D.[3] | N.D. | Rejected bag test - too high a bag pressure |
| 2 | normal | 0.576 | 17.36 | N.D. | N.D. | Rejected, uneven idling speed |
| 3 | normal | 0.571 | 17.50 | 5.0 | N.D. | Rejected, uneven idling speed |
| 4 | normal | 0.576 | 17.36 | 4.3 | N.D. | Value OK after exchange of air fly screw |
| 5 | N-1.0 mm[1] | 0.548 | 18.24 | 3.75 | 79 | Original setting - too meagre idling |
| 6 | N-1.0 mm[1] | 0.560 | 17.87 | N.D. | N.D. | |
| 7 | N-1.5 mm[2] | 0.537 | 18.61 | 2.8 | 78 | |
| 8 | N-1.5 mm[2] | 0.568 | 17.69 | 1.5 | (80)[4] | |
| x̄ | N-1.5 mm[2] | 0.553 | 18.15 | — | — | Mean values for tests 7 and 8 |

Result of test 6 compared to test 5: Saving of 0.16 dl/10 km (2.8%) or gain of 0.51 km/l CO-level shows a slight reduction
Result of tests 7-8 (mean values) compared with 4: Saving of 0.23 dl/10 km (4.0%) or gain of 0.79 km/l CO-level reduced by about 50%.
[1]With the composition according to the invention through a nozzle of 1.0 mm diameter
[2]With the composition according to the invention injected through a nozzle of 1.5 mm diameter
[3]N.D. = not determined
[4]Estimated temperature

TABLE 2

Fuel consumption at a constant speed of 100 km/h, and CO-content on idling for car 1

| Test | Fuel system | Liter/10 km | km/liter | CO-content on idling % | Oil temperature °C. | Comments |
|------|-------------|-------------|----------|------------------------|---------------------|----------|
| 1 | normal | 0.900 | 11.11 | N.D.[2] | N.D. | Rejected bag test - too high a bag pressure |
| 2 | normal | 0.917 | 10.90 | N.D. | N.D. | Rejected bag test - too high a bag pressure |
| 3 | normal | 0.798 | 12.65 | N.D. | N.D. | Rejected, uneven idling speed |
| 4 | normal | 0.785 | 12.74 | 7.4 | N.D. | Rejected, uneven idling speed |
| 5 | normal | 0.797 | 12.55 | 4.0 | 84 | |
| 6 | N-1.5 mm[1] | 0.803 | 12.46 | — | — | |
| 7 | N-1.5 mm | 0.808 | 12.37 | 2.5 | 90 | |
| x̄ | N-1.5 mm | 0.806 | 12.42 | — | — | Mean fuel consumption for tests 6 and 7 |

Results of tests 6-7 (mean values) compared to test 5: Increase of 0.09 dl/10 km (1.1%) or loss of 0.13 km/l CO-level reduced by 40%.
[1]With a composition according to the invention, injected through a nozzle of 1.5 mm diameter.
[2]N.D. = not determined.

TABLE 3

Fuel consumption at a constant speed of 50 km/h, and CO-content on idling for car 2

| Test | Fuel system | Liter/km | km/liter | CO-content on idling % | Oil temperature °C. | Comments |
|------|-------------|----------|----------|------------------------|---------------------|----------|
| 1 | normal | 0.600 | 16.57 | N.D.[2] | N.D. | |
| 2 | normal | 0.610 | 16.39 | 6.5 | 84 | |
| 3 | normal | 0.645 | 15.51 | N.D. | N.D. | |
| 4 | normal | 0.649 | 15.42 | 6.5 | 84 | |
| x̄ | normal | 0.626 | 15.97 | 6.5 | — | Mean value for tests 1–4 |
| 5 | N-1.5 mm[1] | 0.623 | 16.06 | N.D. | N.D. | |
| 6 | N-1.5 mm | 0.628 | 15.93 | 3.2 | 83 | |
| 7 | N-1.5 mm | 0.619 | 16.16 | 2.7 | 82 | |
| 8 | N-1.5 mm | 0.626 | 15.97 | 3.8 | 83 | |

TABLE 3-continued

Fuel consumption at a constant speed of 50 km/h, and CO-content on idling for car 2

| Test | Fuel system | Liter/km | km/liter | CO-content on idling % | Oil temperature °C. | Comments |
|---|---|---|---|---|---|---|
| $\bar{x}^2$ | N-1.5 mm | 0.624 | 16.03 | 3.2 | — | Mean value for tests 5-8 |

Result of comparison between mean values $\bar{x}^2$ and $\bar{x}^1$: Saving of 0.02 dl/10 km (0.3%) or gain 0.06 km/l CO-level reduced by about 50%.
[1]With the composition according to the invention injected through a nozzle of 1.5 mm.
[2]N.D. = not determined.

TABLE 4

Fuel consumption at a constant speed of 100 km/h, and CO-content on idling for car 2

| Test | Fuel system | Liter/10 km | km/liter | CO-content on idling % | Oil temperature °C. | Comments |
|---|---|---|---|---|---|---|
| 1 | normal | 0.864 | 11.574 | N.D.[2] | N.D. | |
| 2 | normal | 0.844 | 11.852 | 7.0 | 84 | |
| 3 | normal | 0.844 | 11.352 | N.D. | N.D. | |
| 4 | normal | 0.844 | 11.852 | 6.5 | 84 | |
| $\bar{x}^1$ | normal | 0.849 | 11.782 | 6.75 | — | Mean value for tests 1-4 |
| 5 | N-1.5 mm[1] | 0.844 | 11.852 | 4.0 | 83 | |
| 6 | N-1.5 mm | 0.844 | 11.852 | 3.5 | 83 | |
| $\bar{x}^2$ | N-1.5 mm | 0.844 | 11.852 | 3.5 | — | Mean value for tests 5 and 6 |

Result of comparison between mean values $\bar{x}^2$ and $\bar{x}^1$: Saving of 0.05 dl/10 km (0.6%) or gain 0.07 km/l CO-level reduced by 56%.
[1]With the composition according to the invention injected through a nozzle of 1.5 mm.
[2]N.D. = not determined.

TABLE 5

CO—HC— and NO$_x$— bag contents measured during CVS test on car 1

| Test | | CS[1] | SS[2] | HS[3] | Comments |
|---|---|---|---|---|---|
| 1 | CO, % | 0.22 | 0.07 | 1860 | Rejected bag test - too high a bag pressure |
| | HC, ppm | 1880 | 1140 | 1860 | Incorrect carburetor setting |
| | NO$_x$, ppm | 135 | 100 | N.D.$^x$ | |
| 2 | CO, % | 0.53 | 0.29 | 0.23 | Adjusted carburetor setting |
| | HC, ppm | 2000 | 1320 | 1360 | |
| | NO$_x$, ppm | 112 | 48 | 130 | |
| 3 | CO, % | 0.44 | 0.24 | 0.21 | |
| | HC, ppm | 1480 | 1000 | 1100 | |
| | NO$_x$, ppm | 150 | 73 | 155 | |
| 4 | CO, % | 0.56 | 0.25 | 0.22 | |
| | HC, ppm | 1560 | 650 | 960 | |
| | NO$_x$, ppm | 130 | 57 | 170 | |
| $\bar{x}1$ | CO, % | 0.51 | 0.26 | 0.22 | Mean values for tests 2-4 |
| 5 N-1.5 mm[4] | CO, % | 0.32 | 0.16 | 0.13 | |
| | HC, ppm | 1900 | 960 | 1020 | |
| | NO$_x$, ppm | 105 | 39 | 85 | |
| 6 N-1.5 mm | CO, % | 0.60 | 0.11 | 0.17 | |
| | HC, ppm | 1040 | 860 | 1200 | |
| | NO$_x$, ppm | 125 | 100 | 205 | |
| $\bar{x}2$ | CO, % | 0.46 | 0.14 | 0.15 | Mean values for tests 5 and 6 |

[1]Cold start
[2]Stabilized start
[3]Hot start
[4]With the composition according to the invention injected through a nozzle of 1.5 mm diameter.
Result of comparison between mean values $\bar{x}2$ and $\bar{x}1$: CO-level reduced by approx. 10, 45 and 30% for CS, SS and HS
x Not determined

TABLE 6

Measured power values for car 2

| | Test | | |
|---|---|---|---|
| Engine rpm | Ordinary fuel horsepower | 2 N-1.5 mm[(1)] horsepower | Difference 2. −1. horsepower |
| 2000 | 25.1 | 25.5 | +0.4 |
| 2250 | 28.4 | 28.6 | +0.2 |
| 2500 | 31.6 | 32.6 | +1.0 |
| 2750 | 34.0 | 34.5 | +0.5 |
| 3000 | 36.9 | 37.7 | +0.8 |
| 3250 | 41.0 | 42.0 | +1.0 |
| 3500 | 42.6 | 43.6 | +1.0 |
| 3750 | 45.3 | 45.8 | +0.5 |
| 4000 | 49.7 | 49.7 | ±0 |
| 4250 | 51.7 | 52.1 | +0.4 |
| 4500 | 51.3 | 50.9 | −0.4 |
| 4750 [(2)] | 53.3 | 52.4 | −0.9 |
| 5000 | 52.3 | 50.2 | −2.1 |

[(1)]With the composition according to the invention, nozzle diameter 1.5 mm
[(2)]Corresponds to speed range about 125-140 km/h

TABLE 7

Measured power values for car 2[(1), (2), (3)]

| | Test | | |
|---|---|---|---|
| Engine rpm | 3 horse-$^x$ power | 4 N-1.5 mm[(4)] horse-$^x$ power | Difference 4 − 3 horsepower |
| 2000 | 26.5 | 26.9 | +0.4 |
| 2250 | 29.7 | 29.8 | +0.1 |
| 2500 | 31.2 | 31.7 | +0.5 |
| 2750 | 35.8 | 36.4 | +0.6 |
| 3000 | 40.4 | 40.6 | +0.2 |
| 3250 | 42.7 | 43.5 | +0.8 |
| 3500 | 45.6 | 46.0 | +0.4 |
| 3750 | 48.2 | 49.2 | +1.0 |
| 4000 | 52.2 | 52.6 | +0.4 |
| 4250 | 53.8 | 55.0 | +1.2 |
| 4500 | 54.0 | 56.1 | +2.1 |
| 4750 | 54.4 | 55.5 | +1.1 |
| 5000 | 54.4 | 54.4 | ±0 |

$^x$horsepower values for dynamometer air resistance
Result of the use of the composition according to the invention: A slight, but still an increase of the power at all rpms measured, except at 5000 rpm. [(1)]Measurements after repair of fan and subsequent chassis dynamometer calibration. [(2)]These power measurements took place after the car had run 363 km with admixture of the composition according to the invention. [(3)]Cf. Table 6. [(4)]With the composition according to the invention, nozzle diameter 1.5 mm.

TABLE 8

Check of motor oil from car 1 and car 3

|  | Car 1 without admixture of the composition according to the invention | Car 1 with admixture of the composition according to the invention | Car 3 with admixture of the composition according to the invvention |
|---|---|---|---|
| Tested product | Sump oil | Sump oil | Sump oil |
| Distance run with engine | 77,707 km | 77,935 km |  |
| Test amount | 100 ml | 100 ml |  |
| Insoluble matter, percent by weight, with coagulating agent total amount (n-pentane) insoluble substances | 3.20 | 3.30 | 0.17 |
| substances insoluble in benzene | 1.04 | 1.12 | 0.13 |
| oxidized fuel and/or oil (rubber and resin) | 2.16 | 2.08 | 0.04 |

For the laboratory tests, Series B, two standard automobiles were chosen as test cars, namely a Ford Taunus 1600, model 1975 (car 4), and a Ford Taunus 1600, model 1974 (car 5). Car 4 was tested with and without admixture of the composition according to the invention, while car 5 was tested only with admixture of the composition. Car 5 was the same car as that designated car 2 in Seris A, but had now been driven about 40,000 km with admixture of the composition.

Before the measurements were made, car 4 was checked and adjusted wherever necessary so as to agree with the manufacturer's specifications on the following points:

(a) compression ratio
(b) distance between the spark plug electrodes
(c) the closure angle of the breaker contact
(d) resistance of the spark plug cover
(e) idling speed
(f) air/fuel ratio at idling No adjustments were made on car 5.

After the cars had been mounted on the chassis dynamometers, they were run for determination of:

1. Carbon monoxide content (CO) as well as content of hydrocarbons (HC) and nitrous gases (NO/NO$_x$) in the exhaust gases at idling and at various speeds according to the driving program of the E.C.E. method (Economic Commission of Europe).
2. Gas volume.
3. Gasoline consumption at various fixed speed.
4. Power curve.

The measurements were made by so-called "CVS bag analysis". In the tests, use was made of a composition consisting of 67% of a 6% hydrogen peroxide, 27.9% ethanol, 5% of a thin lubricating oil, and 0.1% anticorrosive. 1 liter of this composition was consumed at a run of about 4,000 km using an injection nozzle of 1.5 mm.

The measuring program was as follows:

(1) Car 4, no admixture of the liquid composition according to the invention; results in Table 9.

1.1 The car was driven about 100 km at 70 km/h in an exhaust gas laboratory for stabilization of the engine conditions.

1.2 Several (5) measurements of the discharge of CO, HC and NO$_x$ and the fuel consumption were made during the ECE driving program.

1.3 The fuel consumption at 80 km/h was measured (5 continuous measurements to establish the time required for the consumption of 100.0 g gasoline).

1.4 The maximum driving wheel effect was measured at 6 different loads.

(2) Car 4, with admixture of the liquid composition according to the invention, no adjustment ("direct result"). Results in Table 10.

2.1 An apparatus for the admixture of the liquid composition according to the invention was mounted on the engine of the car.

2.2 Measurements were made as described under 1.1, 1.2, 1.3 and 1.4.

(3) Car 4, with admixture of the liquid composition according to the invention, adjustment was made to change the carburetor mixing ratio ("adapted result"). Results in Table 11.

3.1 The fuel/air mixture in the carburetor at idling was adjusted so as to obtain a 0.7% CO content in the exhaust gases.

3.2 Measurements were made as described under 1.2, 1.3 and 1.4.

(4) Car 5, with admixture of the liquid composition according to the invention. Results in Table 12.

4.1 Measurements were made on the car such as it was with admixture of the liquid composition. No modifications or adjustments were made. This car had been driven 40,000 km with the use of the system according to the invention.

4.2 Measurements were made as described under 1.2, 1.3 and 1.4.

An automobile engine is influenced by many factors during the course of the measuring program and even if all instructions have been observed to maintain uniform conditions, it is not probable that repeated measurements give exactly the same results. To obtain a basis for definite conclusions, the test results have been statistically analysed.

The statistic analysis had the following purposes:

(1) To estimate from a limited number of observations the range within which the mean values of an essential (unlimited) number of measurements would fall. This range is described by a maximum value and a minimum value at 95% probability.

(2) To determine whether the difference between two measuring series is significant, that is, if it is sufficiently large to hint at an actual change of test conditions. The difference is considered significant when there is less than 5% probability for the difference being only the result of non-recurrent circumstances.

The power measurements were made but once and the statistical analysis was only effected on the average change in percent in each case.

The results obtained with car 2 were *not* compared to those obtained with car 1. The reason is that even if two engines seemingly are identical, there are nevertheless differences in manufacture which cause variations in exhaust gases, fuel consumption and maximum driving wheel effect.

When the cars were run on the chassis dynamometers with admixture of the liquid composition according to the invention, they showed no sign of poorer driving properties in the form of carburetor disturbance etc. as long as the CO content (at idling) was not brought below 0.7–0.8% by volume.

TABLE 9

| | Probable boundary values | | Mean values | Difference from standard | Significant |
|---|---|---|---|---|---|
| | min. | max. | | | |
| ECE Test program - Result per test | | | | | |
| fuel consumption, liter/10 km | 1.26 | 1.33 | 1.30 | — | — |
| discharge of HC, g | 2.26 | 3.25 | 2.76 | — | — |
| discharge of CO, g | 100.50 | 132.60 | 116.60 | — | — |
| discharge of NO, g | 4.32 | 5.48 | 4.90 | — | — |
| Fuel consumption at 80 km/h$^{-1}$, 1/10 km | 0.74 | 0.75 | 0.74 | — | — |
| Maximum power at 80 km/h$^{-1}$ /3 gear, kW | — | — | 40.80 | — | — |
| Maximum power at 100 km/h$^{-1}$ /3 gear, kW | — | — | 42.5 | — | — |
| Maximum power at 60 km/h$^{-1}$ /4 gear, kW | — | — | 21.7 | — | — |
| Maximum power at 80 km/h$^{-1}$ /4 gear, kW | — | — | 30.3 | — | — |
| Maximum power at 100 km/h$^{-1}$ /4 gear, kW | — | — | 36.3 | — | — |
| Maximum power at 120 km/h$^{-1}$ /4 gear, kW | — | — | 40.5 | — | — |
| Mean power increase, % | — | — | — | — | — |

Description:
Ford Taunus, 1975 (Car 4)
1600 c.c.
Chassis No. GBBNPP 08343
Standard model, no admixture of the liquid composition according to the invention.

TABLE 10

| | Probable boundary values | | Mean values | Difference from standard | Significant |
|---|---|---|---|---|---|
| | min. | max. | | | |
| ECE Test program - Result per test | | | | | |
| fuel consumption, liter/10 km | 1.24 | 1.25 | 1.24 | −0.05 | Yes |
| discharge of HC, g | 1.96 | 2.40 | 2.18 | −0.58 | Yes |
| discharge of CO, g | 76.8 | 106.9 | 91.9 | −24.7 | Yes |
| discharge of NO, g | 4.30 | 5.39 | 4.85 | −0.05 | No |
| Fuel consumption at 80 km/h$^{-1}$, 1/10 km | 0.69 | 0.71 | 0.70 | −0.04 | Yes |
| Maximum power effect at 80 km/h$^{-1}$ /3 gear, kW | — | — | 41.2 | — | — |
| Maximum power effect at 100 km/h$^{-1}$ /3 gear, kW | — | — | 43.3 | — | — |
| Maximum power effect at 60 km/h$^{-1}$ /4 gear, kW | — | — | 22.5 | — | — |
| Maximum power effect at 80 km/h$^{-1}$ /4 gear, kW | — | — | 31.0 | — | — |
| Maximum power effect at 100 km/h$^{-1}$ /4 gear, kW | — | — | 37.1 | — | — |
| Maximum power effect at 120 km/h$^{-1}$ /4 gear, kW | — | — | 39.9 | — | — |
| Mean power increase, % | −0.3 | +3.4 | +1.6 | +1.6 | Doubtful |

Description:
Ford Taunus, 1975 (Car 4)
1600 c.c.
Chassis No. GBBNPP 08343
Admixture of the liquid composition according to the invention.
No adjustment.

TABLE 11

| | Probable boundary values | | Mean values | Difference from standard | Significant |
|---|---|---|---|---|---|
| | min. | max. | | | |
| ECE Test program - Result per test | | | | | |
| fuel consumption, liter/10 km | 1.22 | 1.24 | 1.23 | −0.07 | Yes |
| discharge of HC, g | 1.99 | 2.21 | 2.10 | −0.66 | Yes |
| discharge of CO, g | 47.9 | 62.6 | 55.2 | −61.3 | Yes |
| discharge of NO, g | 4.47 | 4.62 | 4.55 | −0.36 | No |
| Fuel consumption at 80 km/h$^{-1}$, 1/10 km | 0.68 | 0.70 | 0.69 | −0.06 | Yes |
| Maximum power effect at 80 km/h$^{-1}$ /3 gear kW | — | — | — | — | — |
| Maximum power effect at 100 km/h$^{-1}$ /3 gear kW | — | — | 43.5 | — | — |
| Maximum power effect at 60 km/h$^{-1}$ /4 gear kW | — | — | 23.0 | — | — |
| Maximum power effect at 80 km/h$^{-1}$ /4 gear kW | — | — | 31.0 | — | — |
| Maximum power effect at 100 km/h$^{-1}$ /4 gear kW | — | — | 37.3 | — | — |
| Maximum power effect at 120 km/h$^{-1}$ /4 gear kW | — | — | 41.5 | — | — |
| Mean power increase, % | 1.2 | 5.0 | 3.1 | 3.1 | Yes |

Description:
Taunus, 1975 (Car 4)
1600 c.c.
Chassis No. GBBNPP 08343
Admixture of the composition according to the invention.
Adjusted at 0.7–0.8% CO at idling.

TABLE 12

| | Probable boundary values | | Mean values | Difference from[(x)] standard | Significant[(x)] |
|---|---|---|---|---|---|
| | min. | max. | | | |
| ECE Test program - Result per test | | | | | |

TABLE 12-continued

|  | Probable boundary values | | Mean values | Difference from[(x)] standard | Significant[(x)] |
| --- | --- | --- | --- | --- | --- |
|  | min. | max. |  |  |  |
| Fuel consumption, liter/10 km | 1.21 | 1.27 | 1.24 | — | — |
| discharge of HC, g | 1.86 | 2.22 | 2.04 | — | — |
| discharge of CO, g | 32.3 | 61.0 | 46.6 | — | — |
| discharge of NO, g | 4.78 | 5.64 | 5.21 | — | — |
| Fuel consumption at 80 km/h$^{-1}$, 1/10 km | 0.66 | 0.67 | 0.67 | — | — |
| Maximum power effect at 80 km/h$^{-1}$ /3 gear, kW | — | — | 40.8 | — | — |
| Maximum power effect at 100 km/h$^{-1}$ /3 gear, kW | — | — | 43.0 | — | — |
| Maximum power effect at 60 km/h$^{-1}$ /4 gear, kW | — | — | 20.9 | — | — |
| Maximum power effect at 80 km/h$^{-1}$ /4 gear, kW | — | — | 30.0 | — | — |
| Maximum power effect at 100 km/h$^{-1}$ /4 gear, kW | — | — | 36.2 | — | — |
| Maximum power effect at 120 km/h$^{-1}$ /4 gear, kW | — | — | 39.6 | — | — |
| Mean power increase, % | — | — |  | — | — |

Description:
Ford Taunus, 1974 (Car 5)
1600 c.c.
Chassis No. GBBNDD 23265
Admixture of the liquid composition according to the invention.
[(x)]Since this car was supplied with the liquid composition according to the invention from the very beginning and had been driven with this admixture for more than 40,000 km, the standard values for this car apply with admixture and there is no basis for a comparison, except for the results shown in Table 11.

A summary of the results of Test Series B will show that the reduction of the fuel consumption and the decrease of the HC and CO contents in the exhaust gases were significant. The decrease of the NO content was not significant but it nevertheless was a decrease and not an increase as usually obtained with the prior art exhaust gas purifying methods.

What we claim and desire to secure by Letters Patent is:

1. A method of improving the combustion of fuel containing hydrocarbon compounds in the combustion chamber or chambers of internal combustion engines in order to reduce fuel consumption and diminish the content of impurities in the exhaust gases of the engine, comprising introducing a liquid composition consisting essentially of 1–10% hydrogen peroxide, 50–80% water, and 15–45% of a $C_{1-4}$ aliphatic alcohol, all by volume, in the form of fine droplets, into the air intake manifold of the internal combustion engine, the air or fuel air mixture in said intake manifold being intimately mixed with the fine droplets of said liquid composition so that said air or said fuel air mixture on entering said combustion chamber contains said liquid composition.

2. A method as claimed in claim 1, wherein said liquid composition also contains an anticorrosive.

3. A method as claimed in claim 1, wherein said aliphatic alcohol is ethanol.

4. A method as claimed in claim 1, wherein said liquid composition comprises 3–7% hydrogen peroxide, 60–75% water, 32–17% ethanol, up to 5% thin lubricating oil and up to 1% anticorrosive.

5. A method as claimed in claim 1, wherein said liquid composition comprises 4% hydrogen peroxide, 63% water, 27.9% ethanol, 5% thin lubricating oil and 0.1% anticorrosive.

6. A method as claimed in claim 1, wherein the liquid composition comprises 2–15% lubricating oil and up to 5% anticorrosive.

* * * * *